United States Patent
Makino et al.

(10) Patent No.: US 10,974,331 B2
(45) Date of Patent: Apr. 13, 2021

(54) WIRE ELECTRICAL DISCHARGE MACHINE AND AUTO WIRE FEEDING METHOD OF WIRE ELECTRICAL DISCHARGE MACHINE

(71) Applicant: FANUC CORPORATION, Yamanashi (JP)

(72) Inventors: Yoshinori Makino, Yamanashi-ken (JP); Shijin Song, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 16/232,235

(22) Filed: Dec. 26, 2018

(65) Prior Publication Data

US 2019/0201994 A1    Jul. 4, 2019

(30) Foreign Application Priority Data

Dec. 28, 2017  (JP) ................................. 2017-252888

(51) Int. Cl.
 *B23H 7/10*   (2006.01)

(52) U.S. Cl.
 CPC ............. *B23H 7/105* (2013.01); *B23H 7/102* (2013.01)

(58) Field of Classification Search
 CPC ................................ B23H 7/102; B23H 7/105
 See application file for complete search history.

(56) References Cited

U.S. PATENT DOCUMENTS

| | | | |
|---|---|---|---|
| 4,629,856 A | 12/1986 | Inoue | |
| 5,045,662 A | 9/1991 | Yamada | |
| 5,048,798 A * | 9/1991 | Araki | G02B 6/4485 254/134.4 |
| 2002/0047538 A1 | 4/2002 | Baiardi et al. | |

(Continued)

FOREIGN PATENT DOCUMENTS

| | | |
|---|---|---|
| CN | 102233463 A | 11/2011 |
| JP | H01127225 A | 5/1989 |
| JP | 2006231417 A | 9/2006 |
| JP | 2012130973 A | 7/2012 |

(Continued)

OTHER PUBLICATIONS

English Abstract and Machine Translation for Japanese Publication No. 2012-130973 A, published Jul. 12, 2012, 10 pgs.

(Continued)

*Primary Examiner* — Erin E McGrath
(74) *Attorney, Agent, or Firm* — Fredrikson & Byron, P.A.

(57) ABSTRACT

A wire electrical discharge machine includes: a guide pipe as a guide member arranged on a path for feeding a wire electrode from a feed roller toward a workpiece and having a passage hole through which the wire electrode is passed; an airflow generator for generating a flow of compressed air in the passage hole and switching a flow direction of compressed air flowing through the passage hole between a forward direction and a reverse direction; a deflection detector for detecting a deflection of the wire electrode; and a control device for controlling the airflow generator so as to generate a flow of compressed air in the forward direction in the passage hole during auto wire feeding and, when the deflection detector detects the deflection, change the flow direction of compressed air to the reverse direction and thereafter switch the flow direction of compressed air to the forward direction.

6 Claims, 8 Drawing Sheets

(56) References Cited

U.S. PATENT DOCUMENTS

2014/0008329 A1* 1/2014 Dohi .................. B23H 7/30
219/69.11
2017/0036283 A1 2/2017 Hada

FOREIGN PATENT DOCUMENTS

| JP | 2012200795 A | 10/2012 |
| JP | 201735744 A | 2/2017 |
| WO | 2015125259 A1 | 8/2015 |

OTHER PUBLICATIONS

English Machine Translation for International Publication No. 2015/125259 A1, published Aug. 27, 2015, 9 pgs.
Extended European Search Report for European Patent Application No. 18248176.2, dated May 27, 2019, 7 pgs.
English Machine Translation of Decision to Grant a Patent mailed by Japan Patent Office (JPO) for Application No. JP2017-252888, dated Mar. 3, 2020, 2 pages.
Untranslated Decision to Grant a Patent mailed by Japan Patent Office (JPO) for Application No. JP2017-252888, dated Mar. 3, 2020, 3 pages.
English Machine Translation of Notification of Reasons for Refusal mailed by Japan Patent Office (JPO) for Application No. JP2017-252888, dated Nov. 26, 2019, 5 pages.
Untranslated Notification of Reasons for Refusal mailed by Japan Patent Office (JPO) for Application No. JP2017-252888, dated Nov. 26, 2019, 5 pages.
English Abstract for Japanese Publication No. 2017-035744 A, published Feb. 16, 2017, 2 pgs.
English Abstract for Japanese Publication No. 2012-200795 A, published Oct. 22, 2012, 1 pg.
English Abstract and Machine Translation for Japanese Publication No. 2006-231417 A, published Sep. 7, 2006, 8 pgs.
English Abstract and Machine Translation for Japanese Publication No. JPH01-127225A, published May 19, 1989, 12 pgs.
English Abstract and Machine Translation for Chinese Publication No. CN102233463A, published Nov. 9, 2011, 12 pgs.

* cited by examiner

WIRE ELECTRICAL DISCHARGE MACHINE AND AUTO WIRE FEEDING METHOD OF WIRE ELECTRICAL DISCHARGE MACHINE

CROSS-REFERENCE TO RELATED APPLICATION

This application is based upon and claims the benefit of priority from Japanese Patent Application No. 2017-252888 filed on Dec. 28, 2017, the contents of which are incorporated herein by reference.

BACKGROUND OF THE INVENTION

Field of the Invention

The present invention relates to a wire electrical discharge machine having an auto wire feeding function for automatically feeding a wire electrode and an auto wire feeding method of the wire electrical discharge machine.

Description of the Related Art

Generally, a wire electrical discharge machine has an auto wire feeding function of automatically inserting a wire electrode into a machining start hole formed in an object to be machined (workpiece) or a machining groove formed by wire electrical discharge machining to perform wire feeding.

However, there are cases where the tip of the wire electrode cannot be inserted into the machining start hole or the machining groove in the workpiece but touches the workpiece, and then the wire electrode is deflected or bent, resulting in failure in auto wire feeding. For this reason, Japanese Laid-Open Patent Publication No. 2017-035744 discloses a configuration in which when a deflection of the wire electrode is detected, a retry process of auto wire feeding is executed by turning the wire electrode feed rollers in reverse to rewind the wire electrode and then turning the rollers forward to feed the wire electrode.

SUMMARY OF THE INVENTION

However, since the motor for turning the roller requires a drive time for actuating the roller from the starting torque to the rated torque, the retry process tends to take time. As a result, there is a concern that the time required for auto wire feeding becomes long disadvantageously.

The present invention has been devised to solve the above problem, it is therefore an object of the present invention to provide a wire electrical discharge machine and an auto wire feeding method of a wire electrical discharge machine, which can shorten the time required for auto wire feeding.

A first aspect of the present invention resides in a wire electrical discharge machine, which includes: a feed roller configured to feed a wire electrode toward a workpiece; a collecting roller configured to collect the wire electrode having passed through the workpiece; a guide member arranged on a path for feeding the wire electrode from the feed roller toward the workpiece and having therein a passage hole through which the wire electrode is passed; an airflow generator configured to generate a flow of compressed air in the passage hole and to switch a flow direction of the compressed air flowing through the passage hole between a forward direction which corresponds to a feeding direction of the wire electrode and a reverse direction opposite to the feeding direction of the wire electrode; a deflection detector configured to detect a deflection of the wire electrode; and a control device configured to control the airflow generator so as to generate a flow of the compressed air in the forward direction in the passage hole during auto wire feeding and so as to, when the deflection detector detects the deflection, change the flow direction of the compressed air flowing through the passage hole to the reverse direction and thereafter switch the flow direction of the compressed air from the reverse direction to the forward direction.

A second aspect of the present invention resides in an auto wire feeding method of a wire electrical discharge machine for automatically feeding a wire electrode. The wire electrical discharge machine includes: a feed roller configured to feed a wire electrode toward a workpiece; a collecting roller configured to collect the wire electrode having passed through the workpiece; a guide member arranged on a path for feeding the wire electrode from the feed roller toward the workpiece and having therein a passage hole through which the wire electrode is passed; and an airflow generator configured to generate a flow of compressed air in the passage hole and to switch a flow direction of the compressed air flowing through the passage hole between a forward direction which corresponds to a feeding direction of the wire electrode and a reverse direction opposite to the feeding direction of the wire electrode. The auto wire feeding method includes: a first step of controlling the airflow generator so as to generate the flow of the compressed air in the forward direction in the passage hole; a second step of detecting a deflection of the wire electrode; and a third step of controlling the airflow generator so as to, when the deflection of the wire electrode is detected, change the flow direction of the compressed air flowing through the passage hole to the reverse direction and thereafter switch the flow direction of the compressed air from the reverse direction to the forward direction.

In the present invention, the compressed air slightly moves the tip of the wire electrode in a random manner, so that it is possible to retry insertion of the wire electrode into the machining start hole or the machining groove of the workpiece. Therefore, compared to the case where the motor is controlled to alternately repeat the rewinding and feeding of the wire electrode, it is possible to achieve retry of wire feeding without requiring time to drive the motor from the starting torque to the rated torque. Thus, according to the present invention, it is possible to shorten the time required for auto wire feeding.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the wire electrical discharge machine and the auto wire feeding method of the wire electrical discharge machine according to the present invention will be detailed by describing preferred embodiments with reference to the accompanying drawings.

Embodiment

[Configuration of Wire Electrical Discharge Machine]

Figure 1:
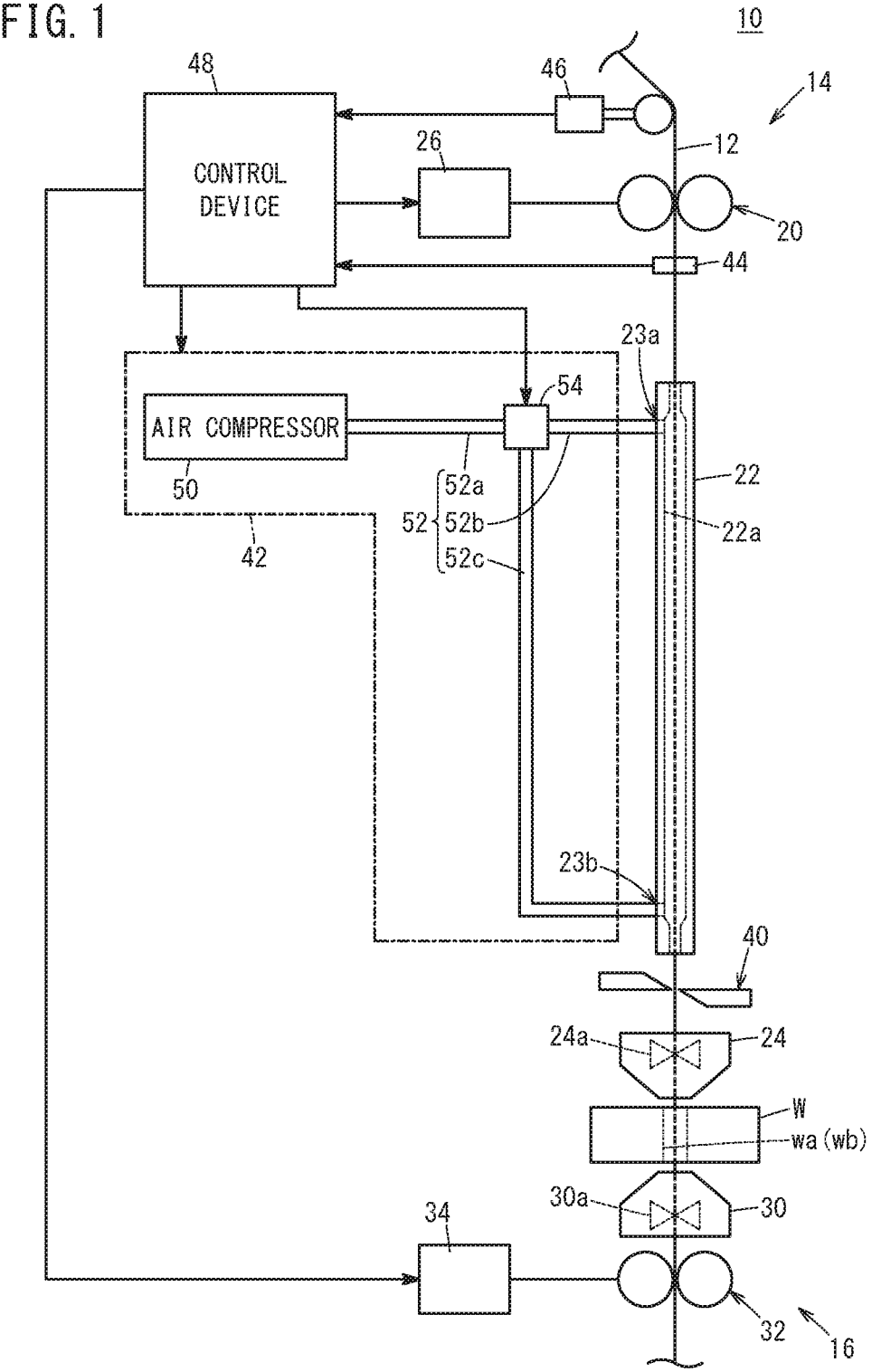
FIG. 1 is a diagram showing a configuration of essential components of a wire electrical discharge machine according to an embodiment.

FIG. 1 is a diagram showing a configuration of essential components of a wire electrical discharge machine 10 according to the embodiment. The wire electrical discharge machine 10 is a machine tool for machining a workpiece W with electric discharge generated between the workpiece W and a wire electrode 12.

The workpiece W is supported on an unillustrated table. The workpiece W may also be referred to as a work. The material of the workpiece W is, for example, a metal material such as an iron-based material or a superhard material (e.g., tungsten carbide). The wire electrode 12 is formed of, for example, tungsten-based, copper alloy-based, brass-based metal or the like.

The wire electrical discharge machine 10 includes a supply system unit 14 for supplying the wire electrode 12 to the workpiece W and a collection system unit 16 for collecting the wire electrode 12 exhausted by machining on the workpiece W.

The supply system unit 14 is a unit for feeding the wire electrode 12 toward the workpiece W and is arranged above the workpiece W. The supply system unit 14 includes at least an unillustrated wire bobbin, feed rollers 20, a guide pipe 22, and a supply side wire guide 24, arranged in order from the upstream side in the feed direction of the wire electrode 12.

The feed rollers 20 deliver or feed the wire electrode 12 supplied from an unillustrated wire bobbin, which is the supply source of the wire electrode 12, to the workpiece W. The feed rollers 20 are rotated by the torque given by a supply side motor 26.

The guide pipe 22 is a guide member for guiding the wire electrode 12 sent out from the feed rollers 20 toward the workpiece W. The guide pipe 22 is laid out in a path for feeding the wire electrode 12 from the feed rollers 20 toward the workpiece W. In the guide pipe 22, an passage hole 22a for allowing the wire electrode 12 to pass through is formed in the feed direction (axial direction of the guide pipe 22).

The supply side wire guide 24 guides the wire electrode 12 that passes through the passage hole 22a of the guide pipe 22 toward the downstream side. The supply side wire guide 24 has a supply side die guide 24a. The supply side die guide 24a positions the wire electrode 12 to be fed to the workpiece W above and near the workpiece W.

The collection system unit 16 is a unit for collecting the wire electrode 12 fed downward through the workpiece W, and is arranged below the workpiece W. The collection system unit 16 includes, at least, a collection side wire guide 30, collecting rollers 32 and an unillustrated bucket for collecting the spent wire electrode 12, arranged in order from the upstream side in the feed direction of the wire electrode 12.

The collection side wire guide 30 guides the wire electrode 12 that has passed through the machining start hole wa or the machining groove wb of the workpiece W, toward the collecting rollers 32. The collection side wire guide 30 has a collection side die guide 30a. The collection side die guide 30a positions the wire electrode 12 that has passed through the workpiece W, below and near the workpiece W. The wire electrode 12 is supported by the supply side die guide 24a and the collection side die guide 30a.

The collecting rollers 32 are arranged under the collection side wire guide 30 to collect the spent wire electrode 12. The collecting rollers 32 are rotated by the torque given by a collection side motor 34. The wire electrode 12 taken up by the collecting rollers 32 is collected by the unillustrated bucket.

The feed rollers 20, the guide pipe 22, the supply side wire guide 24, the collection side wire guide 30, and the collecting rollers 32 are arranged on a straight line in the vertical direction (the direction in which the force of gravity acts). Therefore, the wire electrode 12, which is fed from the feed rollers 20 and collected by the collecting rollers 32, is sent along the vertical direction. When the wire electrode 12 is collected by the collecting rollers 32, a predetermined tension is applied to the wire electrode 12.

The wire electrical discharge machine 10 further includes a wire cutter 40, an airflow generator 42, a deflection detector 44, a tension detector 46, and a control device 48.

The wire cutter 40 is provided, for example, between the guide pipe 22 and the supply side wire guide 24 to cut the wire electrode 12. The wire cutter 40 may be controlled by the control device 48. In FIG. 1, a blade type cutting tool is illustrated as the wire cutter 40 for cutting the wire electrode 12, but other cutting means may be used for the wire cutter 40. For example, electric current may be applied locally to a portion of the wire electrode 12 to be cut, to thereby heat and anneal the portion, and thereafter apply torque to the wire electrode 12, whereby the wire electrode is cut at the annealed portion.

The airflow generator 42 is a device for generating a flow of compressed air in the passage hole 22a of the guide pipe 22, and includes an air compressor 50, a supply pipe 52 and a three-way valve 54. The air compressor 50 generates compressed air and injects the generated compressed air into the supply pipe 52.

The supply pipe 52 guides the compressed air ejected from the air compressor 50 to the passage hole 22a of the guide pipe 22. The supply pipe 52 includes a main pipe 52a that communicates the air compressor 50 with the three-way valve 54, a first branch pipe 52b that communicates the three-way valve 54 with an upper air port 23a of the guide pipe 22, and a second branch pipe 52c that communicates the three-way valve 54 with a lower air port 23b of the pipe 22.

The upper air port 23a is formed in the passage hole 22a at a position near an inlet for the wire electrode 12 (i.e., on an inlet side for the wire electrode 12) and is located at a different position from the inlet for the wire electrode 12, and communicates with the passage hole 22a. The lower air port 23b is formed in the passage hole 22a at a position near an outlet for the wire electrode 12 (i.e., on an outlet side for the wire electrode 12) and is located at a position different from the outlet for the wire electrode 12, and communicates with the passage hole 22a.

The three-way valve 54 communicates the main pipe 52a with the first branch pipe 52b or the second branch pipe 52c, and is controlled by the control device 48. When the three-way valve 54 communicates the main pipe 52a with the first branch pipe 52b, the compressed air generated by the air compressor 50 is injected into the passage hole 22a from the upper air port 23a of the guide pipe 22. An upper part of the passage hole 22a above the upper air port 23a is narrower than a part of the passage hole 22a between the upper air port 23a and the lower air port 23b so that the air-flow resistance in the passage hole 22a becomes higher on the upper side than on the lower side of the upper air port 23a. Therefore, the compressed air flows forward through the passage hole 22a in the same direction as the feed direction of the wire electrode 12.

On the other hand, when the three-way valve 54 communicates the main pipe 52a with the second branch pipe 52c, the compressed air generated by the air compressor 50 is injected into the passage hole 22a from the lower air port 23b of the guide pipe 22. A lower part of the passage hole 22a below the lower air port 23b is narrower than the part of the passage hole 22a between the upper air port 23a and the lower air port 23b so that the air-flow resistance in the passage hole 22a becomes higher on the lower side than on the upper side of the lower air port 23b. Therefore, the compressed air flows in reverse through the passage hole 22a in the direction opposite to the feed direction of the wire electrode 12.

In this way, the airflow generator 42 can switch the direction of the compressed air flowing through the passage hole 22a of the guide pipe 22 between the forward direction and the reverse direction.

The deflection detector 44 detects deflection of the wire electrode 12. Although the deflection detector 44 is installed between the feed rollers 20 and the guide pipe 22 in FIG. 1, the deflection detector 44 may be installed at another position. The detection result detected by the deflection detector 44 is output to the control device 48.

The tension detector 46 detects the tension of the connected wire electrode 12. Although the tension detector 46 is installed upstream of the feed rollers 20 in FIG. 1, the tension detector 46 may be installed at another position. The detection result detected by the tension detector 46 is output to the control device 48.

The control device 48 includes a processor such as a CPU and a memory in which a program is stored, and the processor runs a program stored in the memory to thereby provide the function as the control device 48 of the present embodiment. The control device 48 is a computer that appropriately controls diverse parts (the supply side motor 26, the collection side motor 34 and the airflow generator 42) of the wire electrical discharge machine 10.

The control device 48 starts the auto wire feeding process at the start of machining or after cutting of the wire electrode 12 by the wire cutter 40. That is, the control device 48 controls the airflow generator 42 to thereby generate a forward flow of compressed air in the passage hole 22a of the guide pipe 22. Specifically, the control device 48 controls the three-way valve 54 to establish communication between the main pipe 52a and the first branch pipe 52b, and thereafter actuates the air compressor 50 to thereby create forward flow of compressed air in the passage hole 22a of the guide pipe 22.

In this state, as the control device 48 controls the supply side motor 26 to rotate the feed rollers 20, the wire electrode 12 is sent out from the wire bobbin to the workpiece W.

In this way, the control device 48 feeds the wire electrode 12 to the workpiece W while generating compressed air flowing in the forward direction through the passage hole 22a of the guide pipe 22. As a result, the control device 48 can move the wire electrode 12 forward while preventing slack of the wire electrode 12 by compressed air. Therefore, the wire electrode 12 can be easily inserted into the machining start hole wa or the machining groove wb of the workpiece W.

In order to collect the wire electrode 12 passing through the machining start hole wa or the machining groove wb of the workpiece W, the control device 48 controls the collection side motor 34 to start rotating the collecting rollers 32 before the wire electrode 12 fed by the feed rollers 20 reaches the collecting rollers 32.

Further, when starting auto wire feeding, the control device 48 monitors the deflection and tension of the wire electrode 12 during auto wire feeding, based on the outputs from the deflection detector 44 and the tension detector 46. The term "during auto wire feeding" means a period from the time at which the feed rollers 20 starts feeding the wire electrode 12 downward in order to start auto wire feeding of the wire electrode 12 until the time at which the wire electrode 12 is fed by a predetermined length. The predetermined length is a distance from the feed rollers 20 to the collecting rollers 32 at least. If the wire electrode 12 is fed downward by at least the distance from the feed rollers 20 to the collecting rollers 32, the wire electrode 12 is collected by the collecting rollers 32 so that a predetermined tension is applied to the wire electrode 12. Therefore, the control device 48 can determine that the auto wire feeding is successful, based on the output from the tension detector 46.

Specifically, when the deflection detector 44 has detected no deflection of the wire electrode 12 while the tension detector 46 detects a tension equal to or higher than a threshold until the predetermined length of the wire electrode 12 is fed, the control device 48 determines that the auto wire feeding is successful. In this case, the control device 48 stops the airflow generator 42, the supply side motor 26 and the collection side motor 34 to complete the auto wire feeding process.

On the other hand, when the deflection detector 44 detects a deflection of the wire electrode 12 before the predetermined length of the wire electrode 12 is fed, the tip of the wire electrode 12 abuts against the workpiece W or any other object because the wire electrode 12 cannot be inserted through the machining start hole wa or the machining groove wb of the workpiece W or for any other reason. In this case, the control device 48 starts a retry process.

That is, the control device 48 controls the supply side motor 26 and the collection side motor 34 to stop the feed rollers 20 and the collecting rollers 32. In this state, the control device 48 controls the airflow generator 42 to alternately switch the direction of the compressed air flowing through the passage hole 22a of the guide pipe 22 between the reverse direction and the forward direction.

Specifically, the control device 48 controls the three-way valve 54 so as to switch connection of the main pipe 52a of the supply pipe 52 in turns to the second branch pipe 52c and to the first branch pipe 52b, thereby switch the direction of compressed air flowing through the passage hole 22a of the pipe 22 between the reverse direction and the forward direction. Note that this switching operation is performed, for example, about several times per second.

As a result, the control device 48 can slightly move the tip of the wire electrode 12 in a random manner. Therefore, the wire electrode 12 can be easily inserted into the machining start hole wa or the machining groove wb of the workpiece W even if the tip of the wire electrode 12 collides with or touches the workpiece W or any other object because the wire electrode 12 cannot be inserted through the machining start hole wa or the machining groove wb of the workpiece W or for any other reason.

When the deflection that has been detected by the deflection detector 44 becomes undetected, the control device 48 controls the airflow generator 42 to maintain the direction of compressed air flowing through the passage hole 22a of the guide pipe 22 in the forward direction, and terminates the retry process. Thereafter, the control device 48 controls the supply side motor 26 to rotate the feed rollers 20 again and resume the feeding of the wire electrode 12, thereby resuming auto wire feeding.

On the other hand, when the deflection of the wire electrode 12 does not become undetected by the deflection detector 44 even after the number of times that the flowing direction of the compressed air has been alternately switched between the reverse direction and the forward direction exceeds a predetermined number of times, the control device 48 determines that auto wire feeding has failed. In this case, the control device 48 stops the airflow generator 42 and terminates the retry process and the auto wire feeding process. When the auto wire feeding fails, the wire electrode 12 is cut by the wire cutter 40, and the auto wire feeding process is restarted as necessary.

[Auto Wire Feeding Method]

Figure 2:
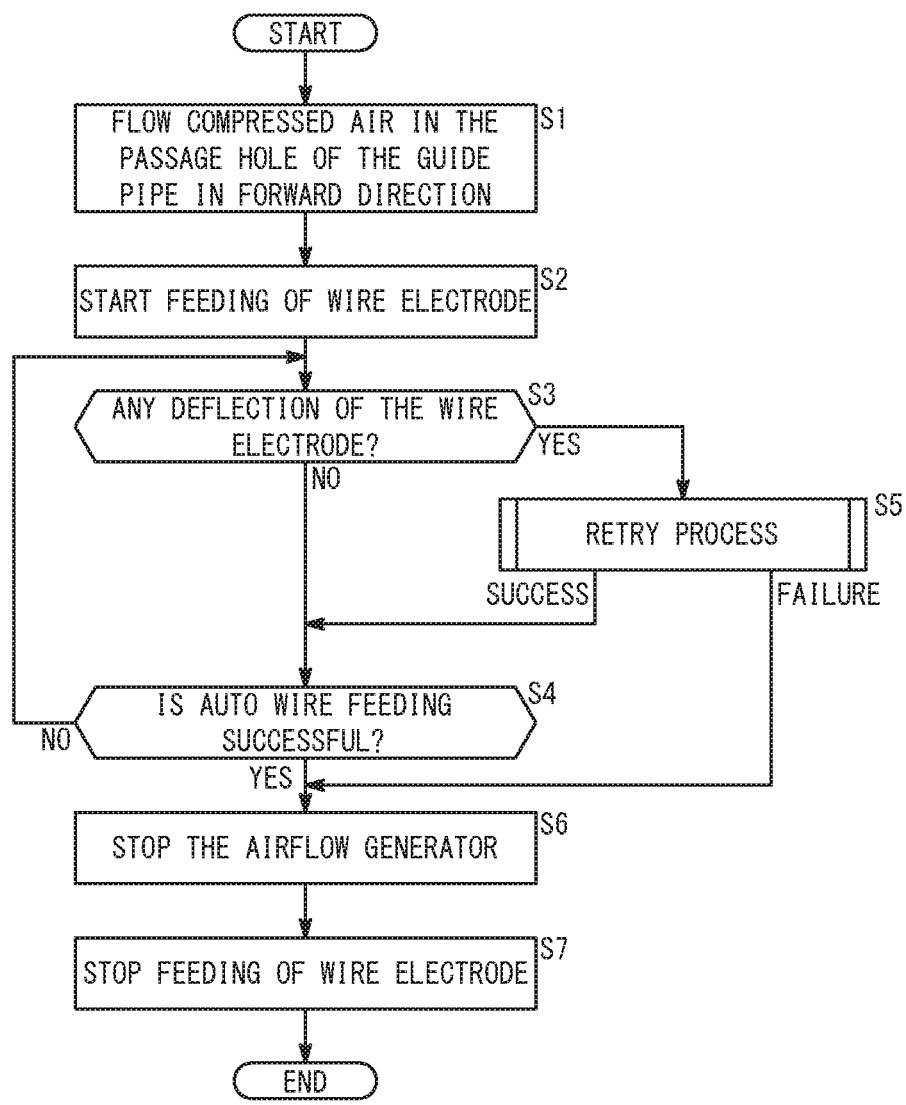
FIG. 2 is a flowchart showing the flow of an auto wire feeding process executed by a control device in the wire electrical discharge machine shown in FIG. 1.

Next, the auto wire feeding method of the wire electrical discharge machine 10 will be described. FIG. 2 is a flow chart showing a flow of an auto wire feeding process executed by the control device 48 of the wire electrical discharge machine 10.

At step S1, the control device 48 controls the airflow generator 42 so as to generate a forward flow of compressed air in the passage hole 22a of the guide pipe 22, then the control goes to step S2. At step S2, the control device 48 controls the supply side motor 26 to turn the feed rollers 20, thereby starting feeding of the wire electrode 12. The control device 48 also controls the collection side motor 34 to turn the collecting rollers 32, and the control proceeds to step S3.

At step S3, the control device 48 determines whether or not a deflection of the wire electrode 12 has been detected by the deflection detector 44. When no deflection of the wire electrode 12 is detected, the control proceeds to step S4.

At step S4, the control device 48 determines whether or not the auto wire feeding has succeeded. Here, when the wire electrode 12 is collected by the collecting rollers 32 without slack or deflection of the wire electrode 12 and the tension detector 46 detects a tension that is equal to or greater than the threshold value, the control device 48 determines that the auto wire feeding has been successfully done. On the other hand, if the wire electrode 12 has not yet been collected by the collecting rollers 32 and tension equal to or greater than the threshold value is not detected, the control device 48 determines that the auto wire feeding has not yet been successful, and the control returns to step S3 so as to monitor the deflection of the wire electrode 12 based on the output from the deflection detector 44.

When deflection of the wire electrode 12 is detected at step S3, the control proceeds to step S5, in which the control device 48 executes a retry process. The operation of this retry process will be described later. When the deflection of the wire electrode 12 becomes undetected by executing the retry process, the control proceeds to step S4. When the deflection of the wire electrode 12 does not become undetected even after the retry process has been executed, the control goes to step S6.

At step S6, the control device 48 stops the airflow generator 42, and the control proceeds to step S7. At step S7, the control device 48 controls the supply side motor 26 to stop the feed rollers 20, whereby feeding of the wire electrode 12 is stopped. Thus, the auto wire feeding process is completed.

Figure 3:
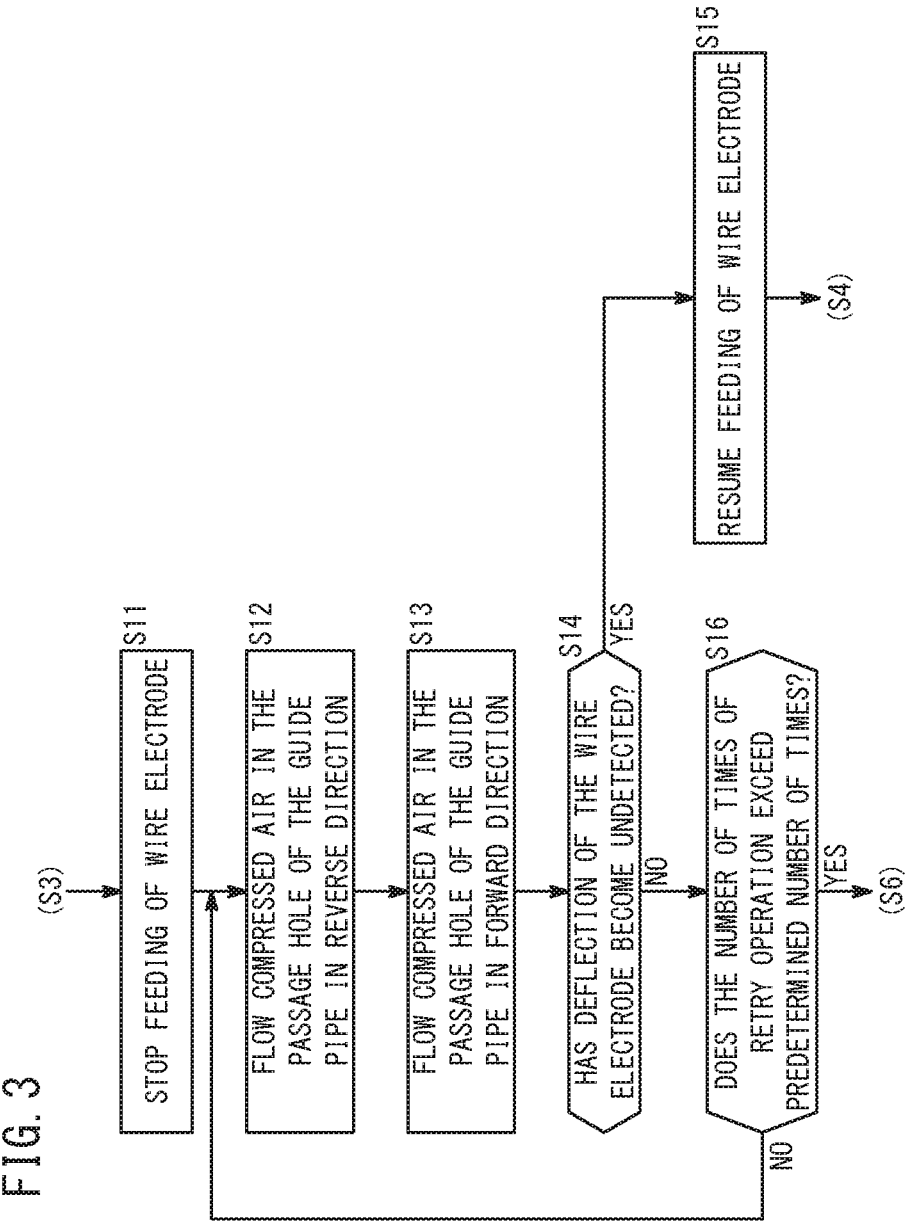
FIG. 3 is a flowchart showing the flow of a retry process at step S5 shown in FIG. 2.

Next, the retry process will be described. FIG. 3 is a flowchart showing the flow of the retry process at step S5 shown in FIG. 2.

At step S11, the control device 48, by controlling the supply side motor 26 and the collection side motor 34, stops the feed rollers 20 and the collecting rollers 32 so that feeding of the wire electrode 12 is stopped. Then, the control proceeds to step S12.

The control device 48 controls the airflow generator 42 so as to cause compressed air to flow in the passage hole 22a of the guide pipe 22 in the reverse direction at step S12, and then controls the airflow generator 42 so as to cause compressed air to flow in the passage hole 22a of the guide pipe 22 in the forward direction at step S13. Thereafter, the control device 48 proceeds to step S14.

At step S14, the control device 48 determines whether or not deflection of the wire electrode 12 has become undetected by the deflection detector 44. If it is undetected, the control device 48 proceeds to step S15. At step S15, the control device 48 controls the supply side motor 26 and the collection side motor 34 to turn the feed rollers 20 and the collecting rollers 32 again so as to resume the feeding of the wire electrode 12. Thus, the control device 48 terminates the retry process and goes to step S4 (see FIG. 2).

On the other hand, if the deflection of the wire electrode 12 has not become undetected at step S14, the control device 48 proceeds to step S16 and determines whether or not the number of times the retry operation has been performed exceeds a predetermined number of times. The retry operation is an operation for switching the flow direction of compressed air in the passage hole 22a between the reverse direction and the forward direction successively at steps S12 and S13, and one set of the steps S12 and S13 corresponds to one retry operation.

If the number of times of retry operation does not exceed the predetermined number of times, the control device 48 returns to step S12 and sequentially executes step S12 and step S13 to alternately switch the flow direction of the compressed air between the reverse direction and the forward direction. When the number of times of retry operation exceeds the predetermined number of times, the control device 48 determines that the auto wire feeding has failed. In this case, the control device 48 ends the retry process and proceeds to step S6 (see FIG. 2).

[Operation and Effect]

As described above, in the present embodiment, when deflection of the wire electrode 12 is detected during auto wire feeding, the feeding of the wire electrode 12 is stopped while the airflow generator 42 is controlled so as to change the direction of the compressed air flowing through the passage hole 22a in the guide pipe 22 to the reverse direction and then switch to the forward direction.

As a result, in this embodiment, the tip of the wire electrode 12 can be slightly moved in a random manner by compressed air. Therefore, in the present embodiment, when the wire electrode 12 touches or abuts against the workpiece W or any other object and thereby undergoes a deflection due to deviation of the wire electrode 12 from the machining start hole wa or the machining groove wb, it is possible to retry to insert the wire electrode 12 into the machining start hole wa or the machining groove wb by compressed air.

Accordingly, in the present embodiment, it is possible to achieve retry of auto wire feeding without requiring time to drive the motor from the starting torque to the rated torque, which would be needed in the case where the supply side motor 26 is controlled to repeat rewinding and feeding of the wire electrode 12 alternately. As a result, according to the present embodiment, it is possible to shorten the time required for auto wire feeding.

When the supply side motor 26 is controlled to alternately repeat the rewinding and feeding of the wire electrode 12, the wire electrode 12 tends to move up and down regularly at the same position. In contrast to this, in the present embodiment, as described above, the tip of the wire electrode 12 is slightly moved irregularly at different positions by the viscosity of the compressed air. Therefore, according to the present embodiment, as compared to the case where the supply side motor 26 is controlled to alternately repeat the rewinding and feeding of the wire electrode 12, the wire electrode 12 can be inserted more easily through the machining start hole wa or the machining groove wb.

In addition, as compared to the case where the supply side motor 26 is controlled to alternately repeat the rewinding and feeding of the wire electrode 12, the moving length of the tip of the wire electrode 12 when it slightly moves tends to be smaller. Therefore, according to the present embodiment, by slightly moving the tip of the wire electrode 12 finely and irregularly in a short time in a minutely vibrating manner, it is possible to shorten the time required for auto wire feeding while enabling easy insertion of the wire electrode 12 into the machining start hole wa or the machining groove wb.

[Modifications]

Though the present invention has been described by referring to the embodiment as an example, the technical scope of the present invention should not be limited to the range of the above embodiment. It goes without saying that various modifications and improvements can be added to the above embodiment. Further, it is also apparent from the scope of claims that those added with such modifications and improvements should be incorporated in the technical scope of the invention.

[Modification 1]

Figure 4:
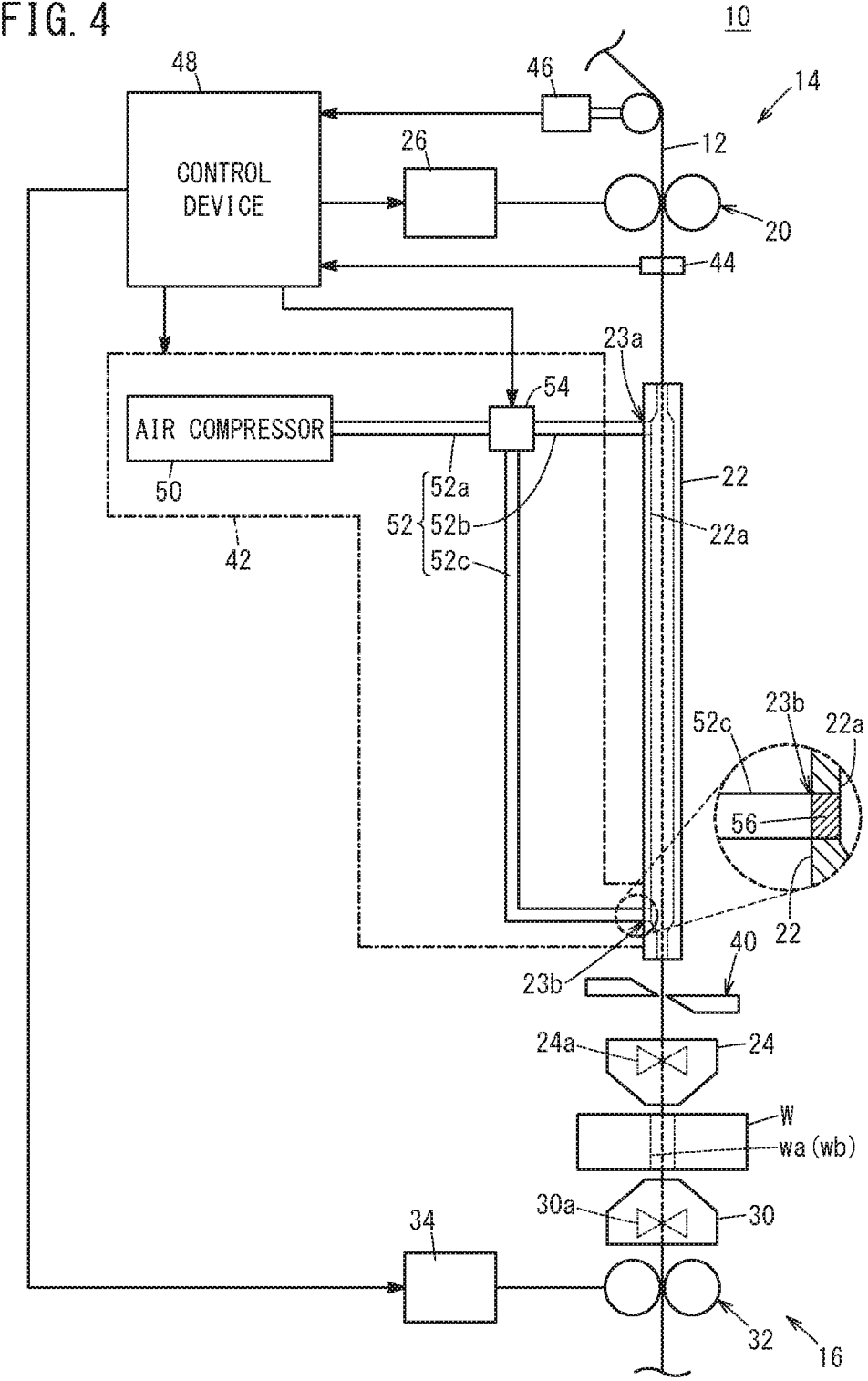
FIG. 4 is a partly enlarged diagram showing a wire electrical discharge machine of Modification 1, modified from that shown in FIG. 1.

FIG. 4 is a partly enlarged diagram showing a wire electrical discharge machine of Modification 1, modified from that shown in FIG. 1. Herein, the same components as those described above are allotted with the same reference numerals and repeated explanation will be omitted as appropriate.

The airflow generator 42 in the wire electrical discharge machine 10 of Modification 1 further includes a turbulence generating member 56. The turbulence generating member 56 disturbs the flow of compressed air and is detachably arranged in the lower air port 23b of the guide pipe 22.

Figure 5:
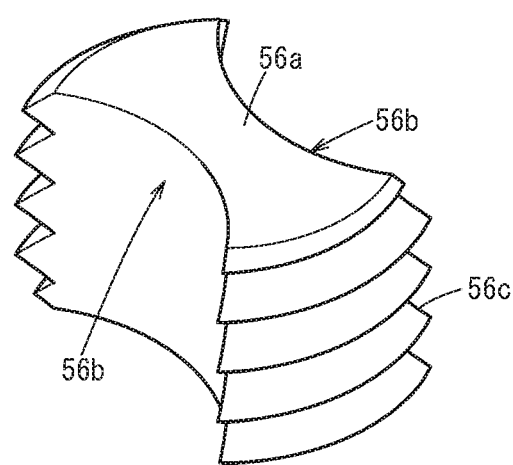
FIG. 5 is a diagram showing a configuration example (1) of a turbulence generating member.

FIG. 5 is a diagram showing a configuration example (1) of the turbulence generating member 56. The turbulence generating member 56 shown in FIG. 5 has a substantially oval shaped main body 56a and flow passages 56b formed in the main body 56a. The flow passage 56b is a recessed portion on the minor axis side of the main body 56a. Screw thread grooves 56c are formed on the major axis side of the main body 56a. The screw thread grooves 56c correspond to screw thread ridges formed on the wall of the guide pipe 22 around the lower air port 23b.

Therefore, the turbulence generating member 56 shown in FIG. 5 can be screwed to the wall of the guide pipe 22 around the lower air port 23b. In this arrangement, gaps are formed between the wall of the guide pipe 22 around the lower air port 23b and the flow passages 56b of the turbulence generating member 56 provided in the lower air port 23b, and compressed air passes through the gaps. The flow passages 56b can be shifted by turning the main body 56a on the screw thread grooves 56c.

Figure 6:
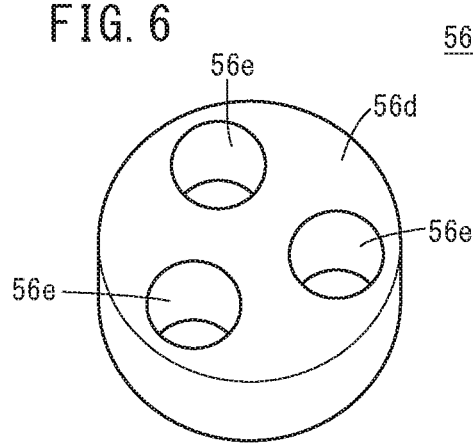
FIG. 6 is a diagram showing a configuration example (2) of a turbulence generating member.
Figure 7:
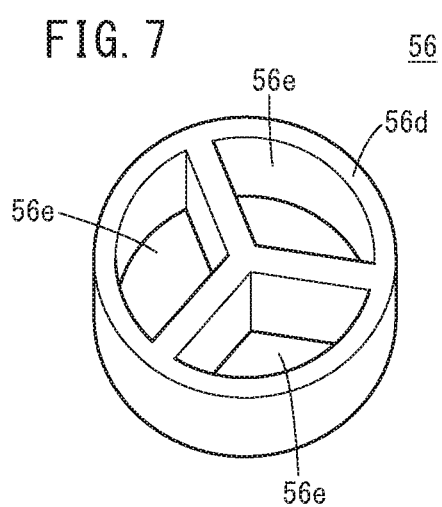
FIG. 7 is a diagram showing a configuration example (3) of a turbulence generating member.

Instead of the turbulence generating member 56 shown in FIG. 5, it is also possible to provide a turbulence generating member 56 shown in FIG. 6 or a turbulence generating member 56 shown in FIG. 7. The turbulence generating members 56 shown in FIGS. 6 and 7 have a cylindrical main body 56d and flow passages 56e formed in the main body 56d.

The main body 56d is fitted into the lower air port 23b in a slidable manner on the wall of the guide pipe 22 around the lower air port 23b. Therefore, the flow passages 56e can be shifted by sliding the main body 56d. The flow passage 56e penetrates from one end face of the main body 56d to the other end face. The flow passage in the example shown in FIG. 6 has a circular cross-section, whereas the flow passage in the example shown in FIG. 7 has a fan shaped cross-section, but other shapes may be used. Although the number of the flow passages 56e is three in the examples shown in FIGS. 6 and 7, more than three flow passages or a single flow passage is possible.

In the wire electrical discharge machine 10 of Modification 1, the turbulence generating member 56 is provided in the lower air port 23b of the guide pipe 22, so that it is possible to disperse the compressed air injected from the air compressor 50 into the lower air port 23b via the second branch pipe 52c to thereby produce turbulent flow of air. As a result, it is possible to slightly move the tip of the wire electrode 12 more irregularly by the compressed air flowing through the passage hole 22a of the guide pipe 22 through the flow passages 56b of the turbulence generating member 56.

It should be noted that the turbulence generating member 56 may have a configuration other than the configurations shown in FIGS. 5 to 7, for example, a protrusion or the like which protrudes from the wall of the guide pipe 22 around the lower air port 23b toward the interior of the lower air port 23b.

In addition, although the turbulence generating member 56 is provided in the lower air port 23b of the guide pipe 22, it may be provided in the second branch pipe 52c. In other words, the turbulence generating member 56 may be provided on the flow path through which compressed air flows between a position at which the compressed air is injected and a position near the outlet for the wire electrode 12 in the passage hole 22a. More specifically, this flow path corresponds to a flow path from the air compressor 50 to the lower air port 23b. In order to slightly move or vibrate the tip of the wire electrode 12 in a more random manner, the turbulence generating member 56 is preferably arranged in the lower air port 23b.

[Modification 2]

Figure 8:
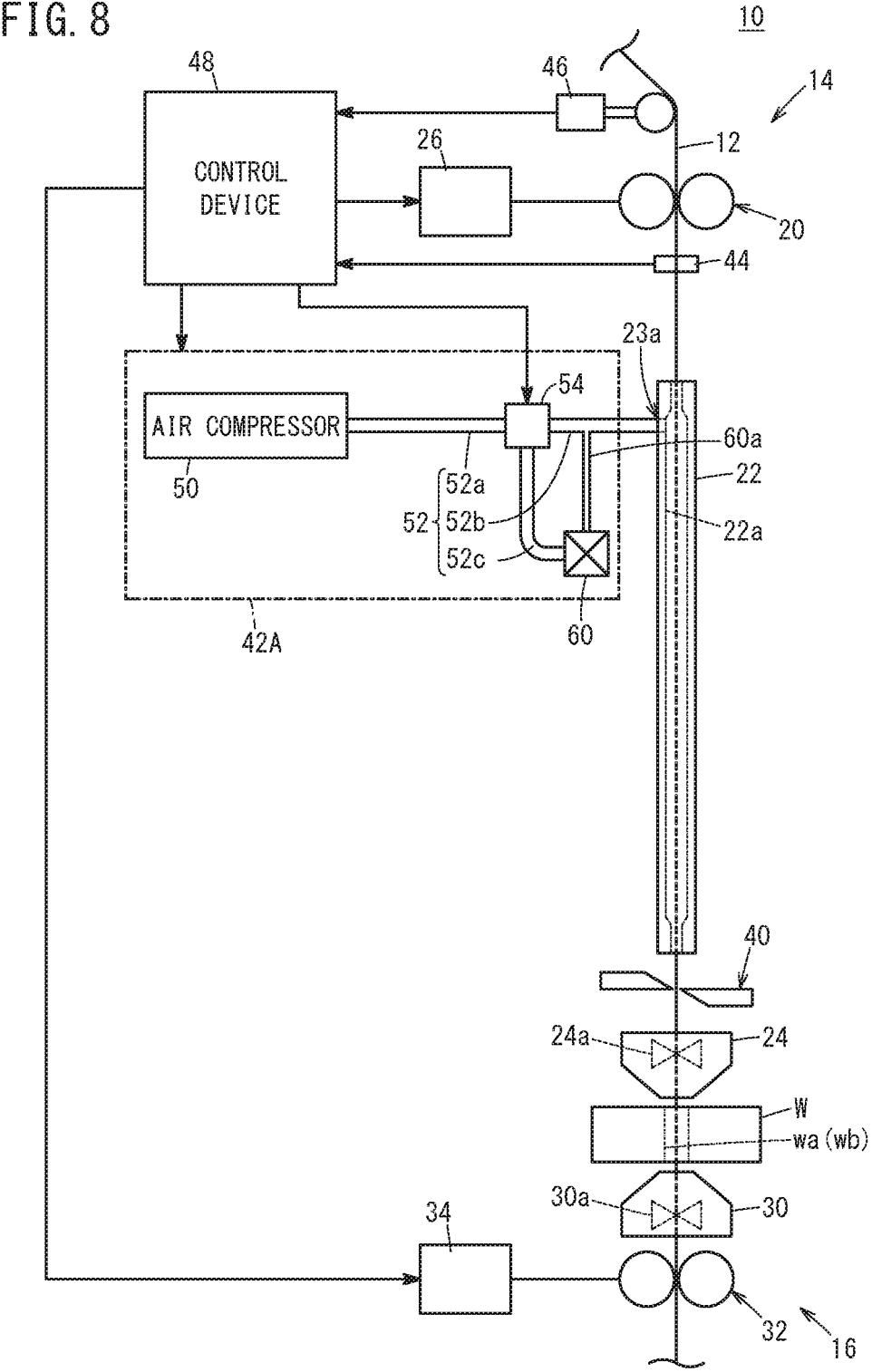
FIG. 8 is a diagram showing a configuration of essential components of a wire electrical discharge machine in Modification 2.

FIG. 8 is a diagram showing a configuration of essential components of a wire electrical discharge machine 10 of Modification 2. Herein, the same components as those described above are allotted with the same reference numerals and repeated explanation will be omitted as appropriate.

The wire electrical discharge machine 10 of Modification 2 has an airflow generator 42A that is different from the airflow generator 42 of the above embodiment. The airflow generator 42A further includes an ejector 60. The ejector 60 communicates with the three-way valve 54 via the second branch pipe 52c and communicates with the first branch pipe 52b via a communication pipe 60a.

In this airflow generator 42A, when the three-way valve 54 connects the main pipe 52a with the first branch pipe 52b, the compressed air generated by the air compressor 50 is injected from the upper air port 23a of the guide pipe 22 into the passage hole 22a. Therefore, the compressed air flows through the passage hole 22a in the forward direction or the same direction as the feed direction of the wire electrode 12.

On the other hand, when the three-way valve 54 connects the main pipe 52a with the second branch pipe 52c, the compressed air generated by the air compressor 50 is discharged to the outside via the ejector 60. Along with this discharge, the air (compressed air) of the guide pipe 22 flows in the reverse direction through the passage hole 22a and is drawn from the upper air port 23a via the communication pipe 60a by the ejector 60.

In this way, the airflow generator 42A of Modification 2 draws in the air inside the passage hole 22a from the inlet side for the wire electrode 12 in the passage hole 22a so that the compressed air flows through the passage hole 22a in the reverse direction.

Therefore, similarly to the airflow generator 42 of the above-described embodiment in which compressed air is injected from the outlet side for the wire electrode 12 in the passage hole 22a, the airflow generator 42A of Modification 2 is able to switch the flow direction of compressed air flowing through the passage hole 22a between the forward direction and the reverse direction.

[Modification 3]

In the above embodiments, the feed rollers 20, the guide pipe 22, the supply side wire guide 24, the collection side wire guide 30 and the collecting rollers 32 are arranged vertically (i.e., in the direction of gravitational force) on a straight line in this order from the upstream side of the wire feeding direction. However, the feed rollers 20, the guide pipe 22, the supply side wire guide 24, the collection side wire guide 30, and the collecting rollers 32 may be arranged on a straight line in order from the upstream side of the wire feeding direction in a direction intersecting the vertical direction or the direction of gravitational force.

[Modification 4]

In the above embodiment, determining the success or failure of auto wire feeding is based on whether or not the tension detector 46 detects a tension that is equal to or greater than the threshold when the wire electrode 12 is collected by the collecting rollers 32 without slack or deflection of the wire electrode 12. However, other methods may be used as a method for determining the success or failure of auto wire feeding.

For example, a detector plate may be arranged on the downstream side of the collecting rollers 32 in the wire feeding direction, so as to determine that the auto wire feeding is successful when contact of the wire electrode 12 is detected by the detector plate and determine that the auto wire feeding has failed when no contact is detected by the detector plate. It should be noted that this determination method and the determination method of the above embodiments may be used together.

[Modification 5]

The above Modifications 1 to 4 may be arbitrarily combined as long as no contradiction arises.

[Technical Ideas]

Technical ideas that can be grasped from the above embodiment and modifications are described below.

[First Technical Idea]

The wire electrical discharge machine (10) includes: a feed roller (20) configured to feed a wire electrode (12) toward a workpiece (W); a collecting roller (32) configured to collect the wire electrode (12) having passed through the workpiece (W); a guide member (22) arranged on a path for feeding the wire electrode (12) from the feed roller (20) toward the workpiece (W) and having therein a passage hole (22a) through which the wire electrode (12) is passed; an airflow generator (42, 42A) configured to generate a flow of compressed air in the passage hole (22a) and to switch the flow direction of the compressed air flowing through the passage hole (22a) between the forward direction which corresponds to the feeding direction of the wire electrode (12) and the reverse direction opposite to the feeding direction of the wire electrode (12); a deflection detector (44) configured to detect a deflection of the wire electrode (12); and a control device (48) configured to control the airflow generator (42, 42A) so as to generate a flow of the compressed air in the forward direction in the passage hole (22a) during auto wire feeding and so as to, when the deflection detector (44) detects the deflection, change the flow direction of the compressed air flowing through the passage hole (22a) to the reverse direction and thereafter switch the flow direction of the compressed air from the reverse direction to the forward direction.

Thus, the compressed air slightly moves the tip of the wire electrode (12) in a random manner, so that it is possible to retry insertion of the wire electrode (12) into the machining start hole (wa) or the machining groove (wb) of the workpiece (W). Therefore, compared to the case where the motor is controlled to alternately repeat the rewinding and feeding of the wire electrode (12), it is possible to achieve retry of wire feeding without requiring time to drive the motor from the starting torque to the rated torque. As a result, the time taken for auto wire feeding can be reduced.

The control device (48) may be configured such that when the deflection detector (44) detects the deflection, the control device (48) switches the flow direction of the compressed air flowing through the passage hole (22a) alternately between the reverse direction and the forward direction until the deflection becomes undetected by the deflection detector (44). As a result, even if the switching is repeated many times, it is possible to reduce the time taken for auto wire feeding, as compared to the case where the motor is controlled to alternately repeat the rewinding and feeding of the wire electrode (12).

The airflow generator (42, 42A) may be configured to inject the compressed air into the passage hole (22a) from a position near the outlet for the wire electrode (12) (i.e., an outlet side for the wire electrode) in the passage hole (22a) so that the compressed air flows through the passage hole (22a) in the reverse direction.

The airflow generator (42) may include a turbulence generating member (56) configured to disturb the flow of the compressed air, the turbulence generating member being arranged on a flow path of the compressed air between the outlet side for the wire electrode (12) in the passage hole (22a) and a position at which the compressed air is injected. This makes it possible to slightly move the tip of the wire electrode (12) in a more random manner.

The turbulence generating member (56) may be provided at an air port (23b) formed at a different position from the outlet for the wire electrode (12) on the outlet side for the wire electrode (12) in the passage hole (22a). This also makes it possible to slightly move the tip of the wire electrode (12) in a more random manner.

The airflow generator (42A) may be configured to draw in air inside the passage hole (22a) from a position near the inlet for the wire electrode (12) (i.e., an inlet side for the wire electrode) in the passage hole (22a) so as to flow the compressed air in the passage hole (22a) in the reverse direction.

[Second Technical Idea]

The auto wire feeding method is a method for a wire electrical discharge machine (10) for automatically feeding a wire electrode (12). The wire electrical discharge machine (10) includes: a feed roller (20) configured to feed a wire electrode (12) toward a workpiece (W); a collecting roller (32) configured to collect the wire electrode (12) having passed through the workpiece (W); a guide member (22) arranged on a path for feeding the wire electrode (12) from the feed roller (20) toward the workpiece (W) and having therein a passage hole (22a) through which the wire electrode (12) is passed; and an airflow generator (42, 42A) configured to generate a flow of compressed air in the passage hole (22a) and to switch the flow direction of the compressed air flowing through the passage hole (22a) between the forward direction which corresponds to the feeding direction of the wire electrode (12) and the reverse direction opposite to the feeding direction of the wire electrode (12). The auto wire feeding method includes: a first step (S1) of controlling the airflow generator (42, 42A) so as to generate the flow of the compressed air in the forward direction in the passage hole (22a); a second step (S3) of detecting a deflection of the wire electrode (12); and a third step (S5) of controlling the airflow generator (42, 42A) so as to, when the deflection of the wire electrode (12) is detected, change the flow direction of the compressed air flowing through the passage hole (22a) to the reverse direction and thereafter switch the flow direction of the compressed air from the reverse direction to the forward direction.

Thus, the compressed air slightly moves the tip of the wire electrode (12) in a random manner, so that it is possible to retry insertion of the wire electrode (12) into the machining start hole (wa) or the machining groove (wb) of the workpiece (W). Therefore, compared to the case where the motor is controlled to alternately repeat the rewinding and feeding of the wire electrode (12), it is possible to achieve retry of wire feeding without requiring time to drive the motor from the starting torque to the rated torque. As a result, the time taken for auto wire feeding can be reduced.

The third step (S5) may be effected such that when the deflection of the wire electrode (12) is detected, the flow direction of the compressed air flowing through the passage hole (22a) is switched alternately between the reverse direction and the forward direction until the deflection of the wire electrode (12) becomes undetected. As a result, even if the switching is repeated many times, it is possible to reduce the time taken for auto wire feeding, as compared to the case where the motor is controlled to alternately repeat the rewinding and feeding of the wire electrode (12).

The airflow generator (42, 42A) may be configured to inject the compressed air into the passage hole (22a) from an outlet side for the wire electrode (12) in the passage hole (22a) so that the compressed air flows through the passage hole (22a) in the reverse direction.

The airflow generator (42) may include a turbulence generating member (56) configured to disturb the flow of the compressed air, the turbulence generating member being arranged on a flow path of the compressed air between the outlet side for the wire electrode (12) in the passage hole (22a) and a position at which the compressed air is injected. This makes it possible to slightly move the tip of the wire electrode (12) in a more random manner.

The turbulence generating member (56) may be provided at an air port (23b) formed at a different position from the outlet for the wire electrode (12) on the outlet side for the wire electrode (12) in the passage hole (22a). This also makes it possible to slightly move the tip of the wire electrode (12) in a more random manner.

The airflow generator (42A) may be configured to draw in air inside the passage hole (22a) from the inlet side for the wire electrode (12) in the passage hole (22a) so as to flow the compressed air in the passage hole (22a) in the reverse direction.

What is claimed is:

1. A wire electrical discharge machine, comprising:
   a feed roller configured to feed a wire electrode toward a workpiece;
   a collecting roller configured to collect the wire electrode having passed through the workpiece;
   a guide member arranged on a path for feeding the wire electrode from the feed roller toward the workpiece and having therein a passage hole through which the wire electrode is passed;
   an airflow generator configured to generate a flow of compressed air in the passage hole and to switch a flow direction of the compressed air flowing through the passage hole between a forward direction which corresponds to a feeding direction of the wire electrode and a reverse direction opposite to the feeding direction of the wire electrode;
   a deflection detector configured to detect a deflection of the wire electrode; and
   a control device configured to control the airflow generator so as to generate a flow of the compressed air in the forward direction in the passage hole during auto wire feeding and so as to, when the deflection detector detects the deflection, change the flow direction of the compressed air flowing through the passage hole to the reverse direction and thereafter switch the flow direction of the compressed air from the reverse direction to the forward direction,
   wherein the airflow generator is configured to inject the compressed air into the passage hole from an outlet side for the wire electrode in the passage hole to direct the flow of the compressed air through the passage hole in the reverse direction,
   the airflow generator includes a turbulence generating member configured to disturb the flow of the compressed air, the turbulence generating member being arranged on a flow path of the compressed air between the outlet side for the wire electrode in the passage hole and a position at which the compressed air is injected,
   wherein a tip of the wire electrode is moved irregularly at different positions by the disturbed flow of the compressed air.

2. The wire electrical discharge machine according to claim 1, wherein when the deflection detector detects the deflection, the control device switches the flow direction of the compressed air flowing through the passage hole alternately between the reverse direction and the forward direction until the deflection becomes undetected by the deflection detector.

3. The wire electrical discharge machine according to claim 1, wherein the turbulence generating member is provided at an air port formed at a different position from an outlet for the wire electrode, wherein the air port is formed on the outlet side for the wire electrode in the passage hole.

4. An auto wire feeding method of a wire electrical discharge machine for automatically feeding a wire electrode, wherein the wire electrical discharge machine includes: a feed roller configured to feed a wire electrode toward a workpiece; a collecting roller configured to collect the wire electrode having passed through the workpiece; a guide member arranged on a path for feeding the wire electrode from the feed roller toward the workpiece and having therein a passage hole through which the wire electrode is passed; and an airflow generator configured to generate a flow of compressed air in the passage hole and to switch a flow direction of the compressed air flowing through the passage hole between a forward direction which corresponds to a feeding direction of the wire electrode and a reverse direction opposite to the feeding direction of the wire electrode, wherein the airflow generator is configured to inject the compressed air into the passage hole from an outlet side for the wire electrode in the passage hole so that the compressed air flows through the passage hole in the reverse direction, the airflow generator includes a turbulence generating member configured to disturb the flow of the compressed air, the turbulence generating member being arranged on a flow path of the compressed air between the outlet side for the wire electrode in the passage hole and a position at which the compressed air is injected, wherein a tip of the wire electrode is moved irregularly at different positions by the disturbed flow of the compressed air the auto wire feeding method comprising:

a first step of controlling the airflow generator so as to generate the flow of the compressed air in the forward direction in the passage hole;

a second step of detecting a deflection of the wire electrode; and a third step of controlling the airflow generator so as to, when the deflection of the wire electrode is detected, change the flow direction of the compressed air flowing through the passage hole to the reverse direction and thereafter switch the flow direction of the compressed air from the reverse direction to the forward direction.

5. The auto wire feeding method of the wire electrical discharge machine according to claim 4, wherein in the third step, when the deflection of the wire electrode is detected, the flow direction of the compressed air flowing through the passage hole is switched alternately between the reverse direction and the forward direction until the deflection of the wire electrode becomes undetected.

6. The auto wire feeding method of the wire electrical discharge machine according to claim 4, wherein the turbulence generating member is provided at an air port formed at a different position from an outlet for the wire electrode, wherein the air port is formed on the outlet side for the wire electrode in the passage hole.

\* \* \* \* \*